(12) United States Patent
Kwon et al.

(10) Patent No.: US 7,436,402 B2
(45) Date of Patent: Oct. 14, 2008

(54) RENDERING APPARATUS AND METHOD FOR A REAL-TIME 3D ULTRASOUND DIAGNOSTIC SYSTEM

(75) Inventors: Eui Chul Kwon, Seoul (KR); Jae Keun Lee, Seoul (KR)

(73) Assignee: Medison Co., Ltd., Kangwon-do (KR)

( * ) Notice: Subject to any disclaimer, the term of this patent is extended or adjusted under 35 U.S.C. 154(b) by 410 days.

(21) Appl. No.: 10/930,775

(22) Filed: Sep. 1, 2004

(65) Prior Publication Data
US 2006/0044306 A1    Mar. 2, 2006

(51) Int. Cl.
*G06T 15/00*    (2006.01)
*G06F 17/00*    (2006.01)

(52) U.S. Cl. ........................ 345/419; 345/418
(58) Field of Classification Search .............. None
See application file for complete search history.

(56) References Cited

U.S. PATENT DOCUMENTS

| | | | |
|---|---|---|---|
| 5,396,890 A | 3/1995 | Weng | |
| 6,545,678 B1 * | 4/2003 | Ohazama | 345/427 |
| 6,690,371 B1 * | 2/2004 | Okerlund et al. | 345/424 |
| 2002/0065861 A1 * | 5/2002 | Kim et al. | 708/270 |
| 2004/0138560 A1 | 7/2004 | Paladini | |

FOREIGN PATENT DOCUMENTS

| | | |
|---|---|---|
| EP | 0 806 682 A2 | 11/1997 |
| EP | 1 046 929 A2 | 10/2000 |
| JP | 2002-059138 | 7/2002 |
| KR | 2001-0089766 | 10/2001 |
| WO | WO 01/33251 A1 | 5/2001 |

OTHER PUBLICATIONS

Svetoslav Ivanov Nikolov, et al., "Real time 3D visualization of ultrasonic data using a standard PC", Ultrasonics, IPC Science and Technology Press Ltd., vol. 41, No. 6, XP-004437390, Aug. 2003, pp. 421-426.
U.S. Appl. No. 10/930,775, filed Sep. 1, 2004, Kwon et al.
U.S. Appl. No. 11/255,012, filed Oct. 21, 2005, Lee.

* cited by examiner

*Primary Examiner*—Ulka Chauhan
*Assistant Examiner*—Daniel F Hajnik
(74) *Attorney, Agent, or Firm*—Oblon, Spivak, McClelland, Maier & Neustadt, P.C.

(57) ABSTRACT

The present invention relates to a rendering apparatus and method for a real-time 3D ultrasound diagnostic system, which can improve both the speed of rendering in a real-time manner 3D ultrasonic images and 2D ultrasonic images therefrom, based on the view operation for displaying ultrasonic images for a target object and the speed of scanning and converting 3D data.

9 Claims, 3 Drawing Sheets
(1 of 3 Drawing Sheet(s) Filed in Color)

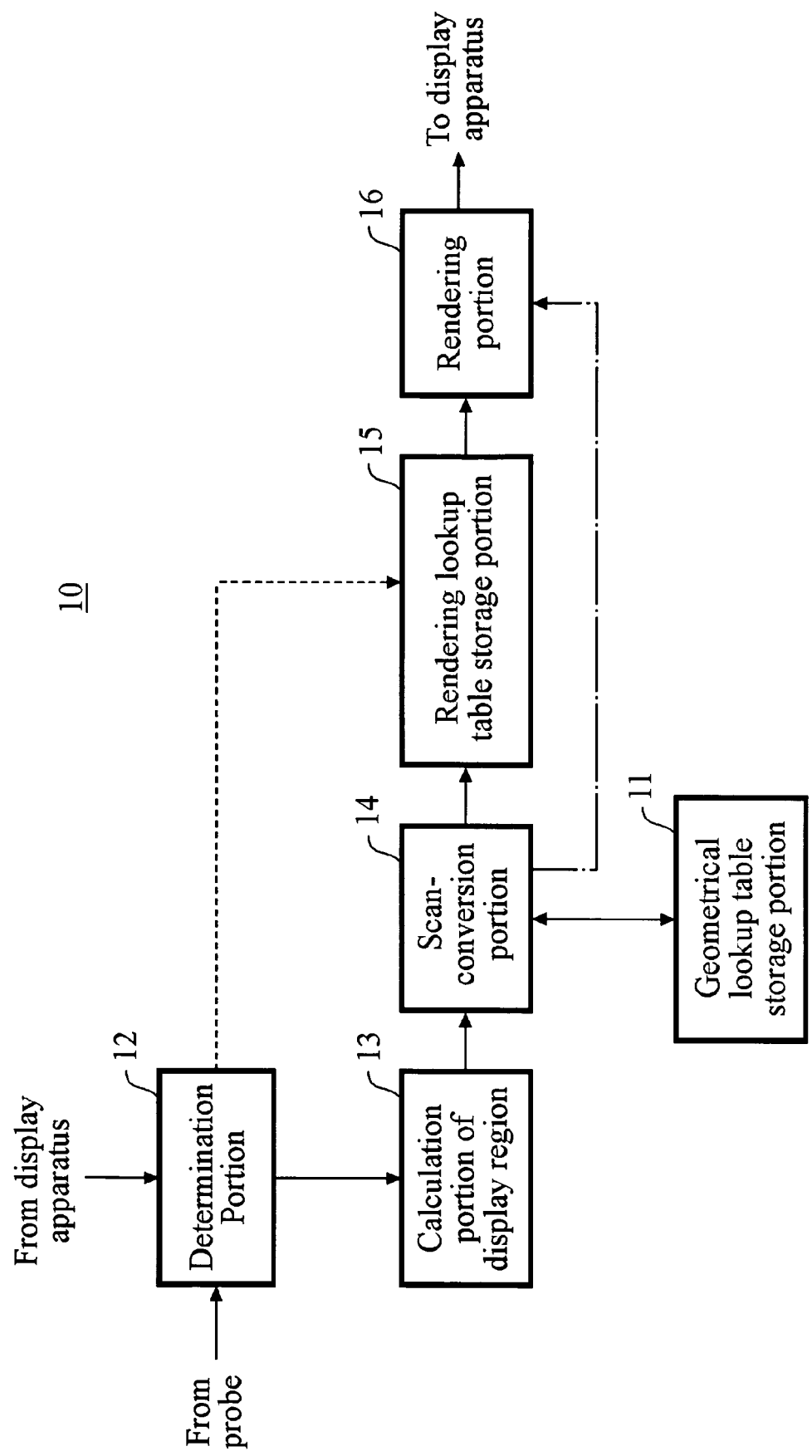

RENDERING APPARATUS AND METHOD FOR A REAL-TIME 3D ULTRASOUND DIAGNOSTIC SYSTEM

FIELD OF THE INVENTION

The present invention relates to a real-time ultrasound diagnostic system; and more particularly, to an apparatus and method for rendering a 3-dimensional (3D) ultrasonic image.

BACKGROUND OF THE INVENTION

Generally, a real-time 3D ultrasound diagnostic system is a medical tool for providing clinical information, such as 3D information and anatomical profiles, which could not be provided by a conventional 2D image, in a real-time manner. This kind of medical tool now tends to be widely used for the purpose of internal or obstetric treatment. This 3D ultrasound diagnostic system scans and converts 3D data for a target object received from a probe, renders the 3D data, and displays the rendered 3D ultrasonic image on a display device, such as a monitor or a screen, to let the user observe the 3D ultrasonic image of the target object in a real-time manner.

FIG. 1 shows view 1 of the object displayed on a monitor after scanning, conversion, and rendering of 3D data. As shown in FIG. 1, view 1 consists of 3D ultrasonic image 2, 2D ultrasonic image 3 of a coronal view representing the front of 3D ultrasonic image 2, 2D ultrasonic image 4 of a sagittal view representing the side of 3D ultrasonic image 2, and 2D ultrasonic image 5 of a axial view representing the top side of 3D ultrasonic image 2. If a user moves one of ultrasonic images 2-5 of view 1, the rest of the images move together.

The user can obtain clinical information for a target object by operating view 1 displayed based on ultrasonic images 2-5 (i.e., placing view 1 in an operation state) or not operating (i.e., placing view 1 in a static state) any view. The operation state means a view operation, such as movement, upscale, downscale or rotation of ultrasonic images 2-5, or movement of a Region of Interest box (not shown). However, in an operation state, much time is consumed for performing the arc-tangent calculation to scan and convert 3D data forming ultrasonic images 2-5 to 3D rectangular coordinates. Furthermore, since the locations of the 3D data are changed by the conversion of the ultrasonic images, the amount of data to be processed increases.

With reference to FIG. 2, the relationship between the 3D data and view 1 displayed with ultrasonic images 2-5 is described. FIG. 2(a) illustrates 3D data for an object in 3D rectangular coordinate view, FIG. 2(b) illustrates 3D data, as shown in FIG. 2(a), in Y-Z rectangular coordinates, and FIG. 2(c) illustrates 3D data, as shown in FIG. 2(a), in X-R rectangular coordinates, wherein X, Y and Z axes constitute the 3D rectangular coordinates of the view, and the R axis crosses at a right angle with the X axis from the point where 3D untrasonic images start to be obtained.

3D data for an object, received from a mechanical scanning type probe moved by a mechanical arm or rotated by a stepping motor, reside in 3D spatial coordinates, e.g., in conical coordinates as shown in FIG. 2(a). Thus, the user can observe the displayed ultrasonic images by scanning and converting the 3D data in the conical coordinates, and by rendering the converted 3D data. These conical coordinatescan be obtained by calculating the following equations:

$$R = \sqrt{y^2 + z^2} - a \qquad \text{Eq. (1a)}$$

$$\beta = \frac{\pi}{2} + \tan^{-1}\left(\frac{y}{z}\right), \sigma = \frac{\pi}{2} + \tan^{-1}\left(\frac{y}{R}\right), r = \sqrt{x^2 + R^2} - b \qquad \text{Eq. (1b)}$$

Wherein: β, which is in the range of 0-180 degrees, is a scan viewing angle in the range of a swing angle of the stepping motor in the probe; σ, which is in the range of 0-180 degrees, is a probe viewing angle in the range of a width angle of an 2D image scanned by the probe; r is the distance between the starting point of the 3D data and any 3D data in the ultrasonic image; a is the distance between the apexes of the scan viewing angle and the probe viewing angle; and b is the distance between the apex of the probe viewing angle and the starting point of the 3D data. Further, x, y and z are values on X, Y and Z axes, respectively.

In an operation state, in order to find precise conical coordinates of the 3D data to be re-displayed as a converted ultrasonic image by a view operation, calculating Eqs. (1a) and (1b) is unavoidable, which prevents the ultrasonic images converted by the view operation from being rendered in a real-time manner.

Further, in a static state where no view operation is involved, even though 3D ultrasonic images and 2D ultrasonic images therefrom can be rendered in a real-time manner, the processing speed of scanning and converting 3D data to a 3D rectangular coordinate view is relatively low.

SUMMARY OF THE INVENTION

Therefore, the object of the present invention is to solve the above problems. In particular, the object of the present invention is to provide a rendering apparatus and method for a real-time 3D ultrasound diagnostic system, which can improve both the speed of rendering in a real-time manner 3D ultrasonic images and 2D ultrasonic images therefrom based on the view operation for displaying ultrasonic images for a target object and the speed of scanning and converting 3D data.

In order to achieve the above objects, the present invention provides a rendering apparatus for a real-time 3D ultrasound diagnostic system, which comprises:

a first lookup table storage means for storing indices matching a 3D rectangular coordinate view and predetermined values corresponding to the indices;

a determination means for receiving 3D data for a target object and determining whether a display region of the 3D data for the target object has been converted or not;

a calculation means for calculating the display region;

a scan-conversion means for scanning and converting 3D data for the target object; and a rendering means for rendering the converted 3D data based on whether the display region has been converted or not.

Further, the present invention provides a rendering method for use in a real-time 3D ultrasound diagnostic system, which comprises the steps of:

storing in a first lookup table indices matching to a 3D rectangular coordinate view and predetermined values corresponding to the indices;

receiving 3D data for a target object;

determining whether a display region of the 3D data for the target object has been converted or not;

calculating the display region;

scanning and converting 3D data for the target object; and rendering the converted 3D data based on whether the display region has been converted or not.

BRIEF DESCRIPTION OF THE DRAWINGS

The patent or application file contains at least one drawing executed in color. Copies of this patent or patent application publication with color drawing(s) will be provided by the office upon request and the payment of the necessary fee.

The above object and features of the present invention will become more apparent from the following description of the preferred embodiments given in conjunction with the accompanying drawings.

FIG. 3 is a block diagram showing a rendering apparatus for a real-time 3D ultrasonic diagnostic system according to a preferred embodiment of the present invention.

DETAILED DESCRIPTION OF THE INVENTION

Figure 1:
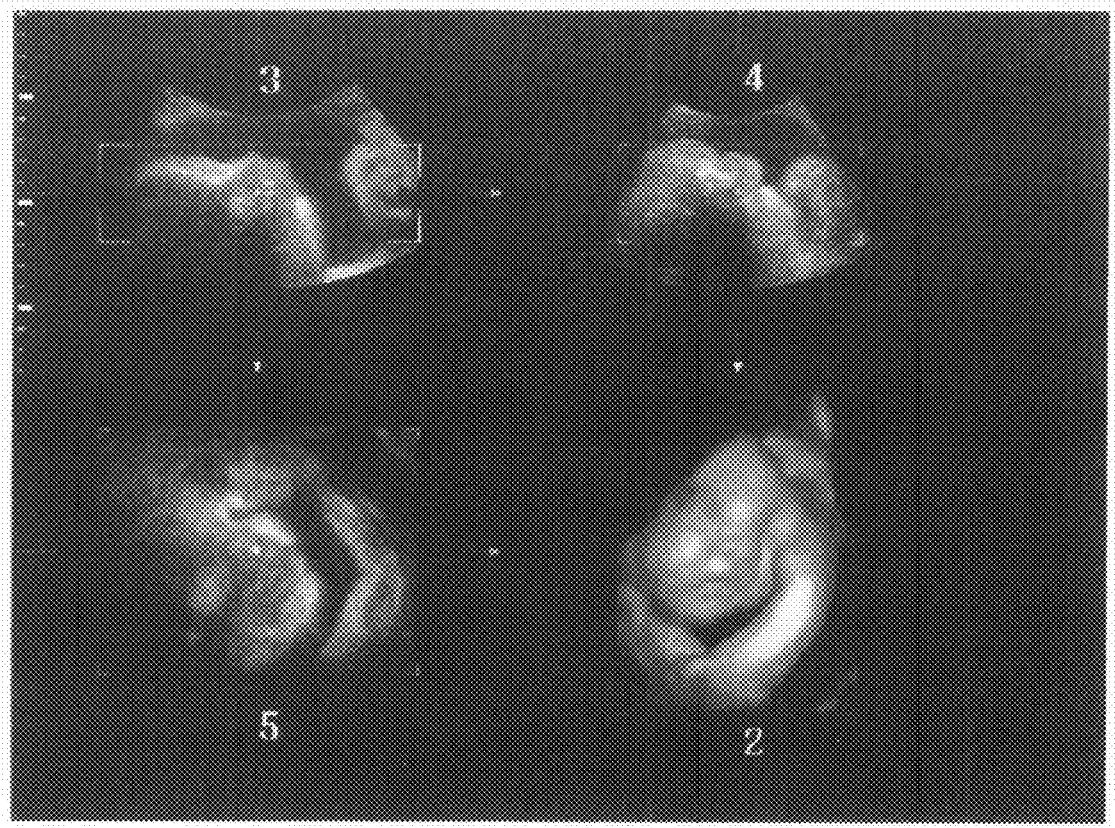
FIG. 1 shows ultrasonic images displayed on a display apparatus for a real-time 3D ultrasonic diagnostic system.
Figure 2A:
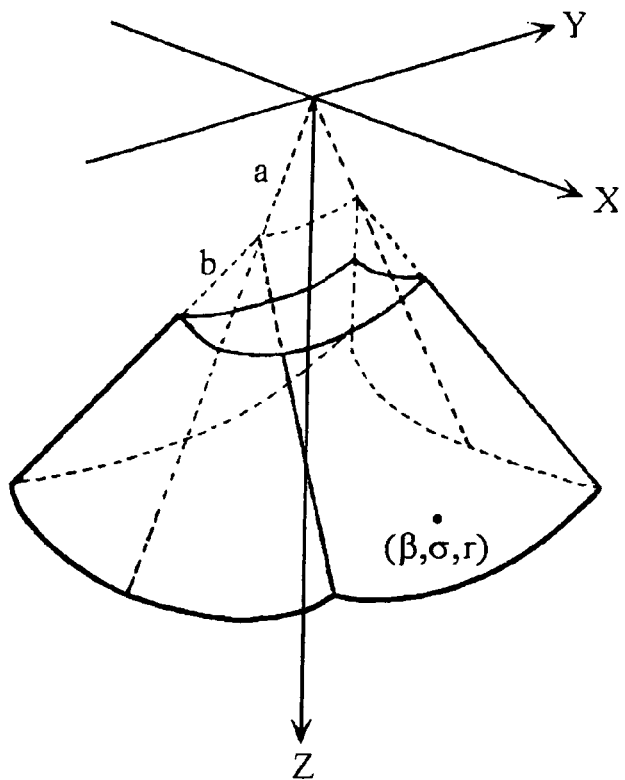
FIG. 2A is a sketch showing 3D data in a 3D ultrasonic image using 3D rectangular coordinates.
Figure 2B:
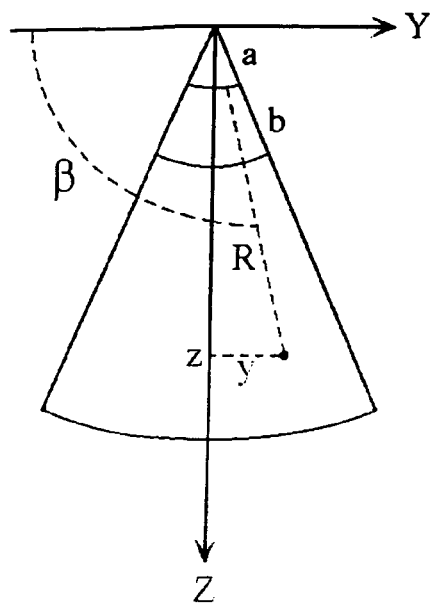
FIG. 2B is a sketch showing the 3D data as show in FIG. 2A using Y-Z coordinates.
Figure 2C:
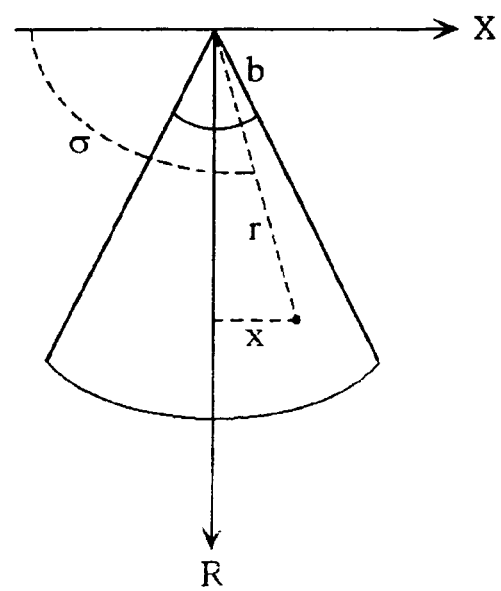
FIG. 2C is a sketch showing the 3D data as shown in FIG. 2A using X-R coordinates.

With reference to FIG. 3, preferred embodiments of the present invention will be described in detail.

FIG. 3 shows a rendering apparatus for a real-time 3D ultrasound diagnostic system according to a preferred embodiment of the present invention. Rendering apparatus 10 for a real-time 3D ultrasound diagnostic system comprises geometrical lookup table storage portion 11, determination portion 12, calculation portion 13 of the display region, scan-conversion portion 14, rendering lookup table storage portion 15, and rendering portion 16.

Geometrical lookup table storage portion 11 generates a geometrical lookup table including indices and arc tangent values corresponding to the indices and stores it. In the following, a process for generating the geometrical lookup table will be explained.

First, arc tangent calculations, such as $\tan^{-1}(y/z)$ and $\tan^{-1}(x/R)$, are performed in order to speed up the scan-conversion of the 3D data received from a probe to 3D rectangular coordinates. In the arc tangent expressions, x, y and z are predetermined values, and R is calculated from the predetermined values of x, y, and z as in Eqs. (1a) and (1b). The following tables teach an example of calculating the value of r by parallel-processing 4 values of y and 4 values of z on the predetermined view to obtain 4 values of R, and then parallel-processing the 4 values of x and the 4 values of R.

TABLE 1A

| | |
|---|---|
| $m_1 = [y_4, y_3, y_2, y_1]$ | inputting the value of y to $m_1$ |
| $m_5 = m_1 \times [y_4, y_3, y_2, y_1]$ | $m_5$ is a square of y |
| $m_2 = [z_4, z_3, z_2, z_1]$ | inputting the value of z to $m_2$ |
| $m_6 = m_2 \times [z_4, z_3, z_2, z_1]$ | $m_6$ is a square of z |
| $m_7 = m_5 + m_6$ | $m_7 = y^2 + z^2$ |
| $m_3 = \text{sqrt}(m_7)$ | $m_3$ is a square root of $y^2 + z^2$ |
| $m_8 = m_3 - a$ | $m_8 = [R_4, R_3, R_2, R_1]$ |

TABLE 1B

| | |
|---|---|
| $m_0 = [x_4, x_3, x_2, x_1]$ | inputting the value of x to $m_0$ |
| $m_4 = m_0 \times [x_4, x_3, x_2, x_1]$ | $m_4$ is a square of x |
| $m_5 = [R_4, R_3, R_2, R_1]$ | inputting the value of R to $m_5$ |
| $m_5 = m_5 \times [R_4, R_3, R_2, R_1]$ | $m_5$ is a square of R |
| $m_9 = m_4 + m_5$ | $m_9 = x^2 + R^2$ |
| $m_{10} = \text{sqrt}(m_9)$ | $m_{10}$ is a square root of $x^2 + R^2$ |
| $m_{11} = m_{10} - b$ | $m_{11} = [r_4, r_3, r_2, r_1]$ |

Table 1A provides an example of calculating the value of R needed for $\tan^{-1}(x/R)$ by parallel-processing the predetermined values of y and z, and table 1B provides an example of calculating the value of r in conical coordinates ($\beta$, $\sigma$, r), where 3D data are located, by parallel-processing the predetermined values of x and R in scan-conversion portion 14, which will be described. Parallel-processing the values of x, y, z and R can contribute to speeding up scanning and conversion of 3D data.

As above, the values of $\tan^{-1}(y/z)$ and $\tan^{-1}(x/R)$ are calculated from the predetermined values of x, y, z and R, and a geometrical lookup table is generated by providing the calculated arc tangent values with indices corresponding to y/z and x/R. That is, the geometrical lookup table includes indices corresponding to $(y_1/z_1)$, $(y_2/z_2)$, . . . , $(y_n/z_n)$, angles corresponding to $\tan^{-1}(y_1/z_1)$, $\tan^{-1}(y_2/z_2)$, . . . , $\tan^{-1}(y_n/z_n)$, indices corresponding to $(x_1/R_1)$, $(x_2/R_2)$, . . . , $(x_n/R_n)$, and angles corresponding to $\tan^{-1}(x_1/R_1)$, $\tan^{-1}(x_2/R_2)$, . . . , $\tan^{-1}(x_n/R_n)$.

Geometrical lookup table storage portion 11 can be used for a static state where ultrasonic images for a target object are initially displayed on a view, a static state where ultrasonic images for a new target object are displayed on a view, and an operation state where the ultrasonic images converted by view operation are displayed on a view.

Further, determination portion 12 of the present invention receives 3D data for a target object from a probe (not shown) or receives messages for performing view operation from a display apparatus (not shown), and transmits to calculation portion 13 the 3D data corresponding to them.

The static state where 3D data for a target object are received and ultrasonic images for the target object are initially displayed on a view will be explained in this section.

Determination portion 12 determines whether the initially received 3D data for a target object from a probe constitutes a static state, and transmits the 3D data to calculation portion 13. Calculation portion 13 calculates the display region of the ultrasonic image from the received 3D data for the target object, and transmits the calculated display region and the 3D data for the target object to scan-conversion portion 14, wherein the display region means a region where ultrasonic images 2-5 are substantially displayed on view 1.

Scan-conversion portion 14 searches geometrical lookup table storage portion 11 for indices matching the 3D rectangular coordinates of the received display region and the arc-tangent values corresponding to the indices, and obtains conical coordinates ($\beta^1$, $\sigma_1$, $r_1$), ($\beta_2$, $\sigma_2$, $r_2$), . . . , ($\beta_n$, $\sigma_n$, $r_n$) corresponding to 3D rectangular coordinates $(x_1, y_1, z_1)$, $(x_2, y_2, z_2)$, . . . , $(x_n, y_n, z_n)$ of the display region by applying the found arc-tangent values to Eqs. (1a) and (1b). Further, scan-conversion portion 14 converts the 3D data at the corresponding conical coordinates to the 3D rectangular coordinates of the display region, and transmits, to rendering lookup table storage portion 15, the converted 3D data, the conical coordinates where the 3D data are located, and the indices from searched geometrical lookup table storage portion 11. As can be known from the above, scan-conversion portion 14 of the present invention utilizes the arc-tangent values included in geometrical lookup table storage portion 11, instead of performing arc-tangent calculations that require much time, and converts the 3D data after obtaining the conical coordinates, where the 3D data are located, by parallel-processing the predetermined values of x, y, z and R. Thus, the speed of converting the 3D data for the target object to the 3D rectangular coordinates of the display region can be enhanced.

Rendering lookup table storage portion 15 generates and stores a rendering lookup table including the indices received from scan-conversion portion 14 and the conical coordinates therefor, and then transmits to rendering portion 16 the 3D data at the conical coordinates. For the purpose of rendering 3D data for a new target object without converting the 3D data for the new target object in a static state where the ultrasonic images for the new target object are displayed on a view, storing the indices and the corresponding conical coordinates is necessary. The details on this static state will be explained later.

Rendering portion 16 renders 3D data in order to display ultrasonic images for the target object by projecting the 3D data received from rendering lookup table storage portion 15 to the 3D rectangular coordinates of the display region. Since the process for rendering the 3D data is similar to that for the conventional volume rendering, the details on the process may be omitted.

The static state where 3D data for a new target object are received and ultrasonic images for the new target object are displayed in a view will be explained in this section.

As above, except for the operation state where ultrasonic images are converted by view operation, the ultrasonic images for a new target object are displayed on the same region with the ultrasonic images for the previous target object, even though the target object has been changed. That is, the conical coordinates for the new target object to be converted to the 3D rectangular coordinates of the display region are identical to those for the previous target object. For example, since the 3D data at conical coordinates $(\beta_n, \sigma_n, r_n)$ of a first target object and the 3D data at conical coordinates $(\beta_n, \sigma_n, r_n)$ of second target object are converted to 3D rectangular coordinates $(x_n, y_n, z_n)$, the indices matching the 3D rectangular coordinates of the display region remain unchanged even if the target object has been changed.

In detail, determination portion 12 directly transmits to rendering lookup table storage portion 15 the 3D data for the new target object received from a probe. Rendering lookup table storage portion 15 transmits to rendering portion 16 the 3D data residing at the conical coordinates stored in rendering lookup table storage portion 15 among the 3D data for the new target object received from determination portion 12. Rendering portion 16 performs a volume rendering process for rendering the received 3D data.

Finally, the operation state where ultrasonic images converted by view operation are displayed on a view will be explained in this section.

A user of real-time 3D ultrasound diagnostic system 10 observes ultrasonic images changed by movement, upscale, downscale or rotation of the displayed ultrasonic images, or movement of a Region of Interest box to obtain clinical information about the target object.

Determination portion 12 receives messages for view operation of the displayed ultrasonic images from a display apparatus (not shown). Then, determination portion 12 transmits to calculation portion 13 the 3D data used for forming the displayed ultrasonic images before receipt of the view operation messages, instead of transmitting to calculation portion 13 the 3D data for the target object received from a probe. Calculation portion 13 calculates the display region of the ultrasonic images converted from the received 3D data according to the view operation messages, and transmits the calculated display region and the 3D data for the target object to scan-conversion portion 14. Scan-conversion portion 14 searches geometrical lookup table storage portion 11 for the indices matching to the 3D rectangular coordinates of the converted display region and the arc-tangent values corresponding to the indices, and obtains precise conical coordinates, by applying the located information to Eqs. (1a) and (1b). Then, scan-conversion portion 14 scans and converts the 3D data at the conical coordinates to the 3D rectangular coordinates of the converted display region among the received 3D data for display of the ultrasonic images, and directly transmits the converted 3D data to rendering portion 16. Rendering portion 16 performs a volume rendering process for rendering the received 3D data.

In the operation state, the speed of converting the 3D data by processing the arc-tangent values corresponding to the located indices from geometrical lookup table storage portion 11 is much higher than that required for generating a new rendering lookup tables whenever the display region is changed by the view operation. Thus, a real-time rendering of the view-converted 3D ultrasonic images and the 2D ultrasonic images therefrom is possible.

The rendering apparatus for a real-time ultrasound diagnostic system in accordance with the present invention can enhance the speed of rendering 3D ultrasonic images and 2D ultrasonic images therefrom by rendering the target object based on whether view operation for display of the ultrasonic images has been taken. Further, the present invention can enhance the speed of converting the 3D data for a target object by parallel-processing the 3D rectangular coordinate view.

The present invention is described with reference to the preferred embodiments and the drawings, but the description is not intended to limit the present invention to the form disclosed herein. It should also be understood that a person skilled in the art is capable of using a variety of modifications and other embodiments equal to the present invention. Therefore, only the appended claims are intended to limit the present invention.

What is claimed is:

1. A rendering apparatus for a real-time 3-dimensional (3D) ultrasound diagnostic system, the apparatus comprising:

a first lookup table storage means for storing indices matching a 3D rectangular coordinate view and predetermined values corresponding to the indices;

a determination means for receiving 3D data for a target object and determining whether the 3D data is initially received and whether a display region of the 3D data for the target object has been changed or not;

a calculation means for calculating the display region;

a scan-conversion means for searching the first lookup table storage means for indices matching the calculated display region and predetermined values corresponding to the searched indices to obtain conical coordinates corresponding to the calculated display region and scanning and converting the 3D data for the target object;

a second lookup table storage means for receiving the 3D data from the determination means and storing the searched indices and the conical coordinates corresponding to the searched indices; and a rendering means for rendering the converted 3D data received from the scan-conversion means when it is determined that the display region is changed at the determination means or the 3D data is initially received, and for rendering the 3D data received from the second lookup table storage means by using the indices and the conical coordinates stored in the second lookup table storage means when it is determined that the display region is not changed at the determination means.

2. The apparatus as claimed in claim 1, wherein the predetermined values are $\tan^{-1}(y/z)$ and $\tan^{-1}(x/R)$ according to the following equations for the 3D rectangular coordinate view:

$$R = \sqrt{y^2+z^2} - a$$
$$\beta = \frac{\pi}{2} + \tan^{-1}\left(\frac{y}{z}\right), \sigma = \frac{\pi}{2} + \tan^{-1}\left(\frac{y}{R}\right), r = \sqrt{x^2+R^2} - b$$

wherein: β, which is in a range of 0-180 degrees, is a scan viewing angle in a range of a swing angle of a stepping motor in a probe; σ, which is in a range of 0-180 degrees, is a probe viewing angle in a range of a width angle of an 2D image scanned by the probe; r is a distance between a point where the 3D ultrasonic images start to be obtained and any 3D data in the ultrasonic image; a is a distance between apexes of the scan viewing angle and the probe viewing angle; b is a distance between the apex of the probe viewing angle and the starting point of the 3D data, and x, y and z are values on X, Y and Z axes, respectively, and the first lookup table storage means stores values of $\tan^{-1}(y/z)$ and $\tan^{-1}(x/R)$ calculated from the above equations by parallel-processing predetermined values of x, y and z.

3. The apparatus as claimed in claim 2, wherein, if the 3D data for the target object is initially displayed on the display region as an ultrasonic image, the rendering means renders the converted 3D data received from the scan-conversion means.

4. A rendering method for use in a real-time 3D ultrasound diagnostic system, the method comprising:
storing in a first lookup table indices matching to a 3D rectangular coordinate view and predetermined values corresponding to the indices;
receiving 3D data for a target object;
determining whether the 3D data is initially received and a display region of the 3D data for the target object has been changed or not;
calculating the display region;
searching the first lookup table for indices matching the calculated display region and predetermined values corresponding to the searched indices to obtain conical coordinates corresponding to the calculated display region;
scanning and converting 3D data for the target object;
storing in a second lookup table the searched indices and the conical coordinates corresponding to the searched indices;
if it is determined that the display region is changed or the 3D data is initially received, rendering the converted 3D data; and
if it is determined that the display region is not changed, rendering the received 3D data by using the indices and the conical coordinates stored in the second lookup table.

5. The method as claimed in claim 4, wherein the predetermined values are $\tan^{-1}(y/z)$ and $\tan^{-1}(x/R)$ according to the following equations for the 3D rectangular coordinate view:

$$R = \sqrt{y^2+z^2} - a$$
$$\beta = \frac{\pi}{2} + \tan^{-1}\left(\frac{y}{z}\right), \sigma = \frac{\pi}{2} + \tan^{-1}\left(\frac{y}{R}\right), r = \sqrt{x^2+R^2} - b$$

wherein: β, which is in a range of 0-180 degrees, is a scan viewing angle in a range of a swing angle of a stepping motor in a probe; σ, which is in a range of 0-180 degrees, is a probe viewing angle in a range of a width angle of an 2D image scanned by the probe; r is a distance between a point where the 3D ultrasonic images start to be obtained and any 3D data in the ultrasonic image; a is a distance between apexes of the scan viewing angle and the probe viewing angle; b is a distance between the apex of the probe viewing angle and the starting point of the 3D data, and x, y and z are values on X, Y and Z axes, respectively, and the first storage step further comprises the step of storing values of $\tan^{-1}(y/z)$ and $\tan^{-1}(x/R)$ calculated from the above equations by parallel-processing predetermined values of x, y and z.

6. The method as claimed in claim 5, wherein, if it is determined that the 3D data for the target object are initially displayed on the display region as the ultrasonic image, said rendering is performed upon the converted 3D data.

7. A rendering apparatus for a real-time 3-dimensional (3D) ultrasound diagnostic system, the apparatus comprising:
a first lookup table storage unit configured to store indices matching a 3D rectangular coordinate view and predetermined values corresponding to the indices;
a determination unit configured to receive 3D data for a target object and determine whether the 3D data is initially received and a display region of the 3D data for the target object has been changed or not;
a calculation unit configured to calculate the display region;
a scan-conversion unit configured to search the first lookup table storage unit for indices matching the calculated display region and predetermined values corresponding to the searched indices to obtain conical coordinates corresponding to the calculated display region and scan and convert the 3D data for the target object;
a second lookup table storage unit configured to receive the 3D data from the determination unit and store the searched indices and the conical coordinates corresponding to the searched indices; and
a rendering unit configured to render the converted 3D data received from the scan-conversion unit when it is determined that the display region is changed at the determination unit or the 3D data is initially received, and render the 3D data received from the second lookup table storage unit by using the indices and the conical coordinates stored in the second lookup table storage unit when it is determined that the display region is not changed at the determination unit.

8. The apparatus as claimed in claim 7, wherein the predetermined values are $\tan^{-1}(y/z)$ and $\tan^{-1}(x/R)$ according to the following equations for the 3D rectangular coordinate view:

$$R = \sqrt{y^2+z^2} - a$$
$$\beta = \frac{\pi}{2} + \tan^{-1}\left(\frac{y}{z}\right), \sigma = \frac{\pi}{2} + \tan^{-1}\left(\frac{y}{R}\right), r = \sqrt{x^2+R^2} - b$$

wherein: β, which is in a range of 0-180 degrees, is a scan viewing angle in a range of a swing angle of a stepping motor in a probe; σ, which is in a range of 0-180 degrees, is a probe viewing angle in a range of a width angle of an 2D image scanned by the probe; r is a distance between a point where the 3D ultrasonic images start to be obtained and any 3D data in the ultrasonic image; a is a distance between apexes of the scan viewing angle and the probe viewing angle; b is a distance between the apex of the probe viewing angle and the starting point of the 3D data, and x, y and z are values on X, Y and Z axes, respectively, and the first lookup table storage unit stores values of $\tan^{-1}(y/z)$ and $\tan^{-1}(x/R)$ calculated from the above equations by parallel-processing predetermined values of x, y and z.

9. The apparatus as claimed in claim 8, wherein, if the 3D data for the target object are initially displayed on the display region as an ultrasonic image, the rendering unit renders the converted 3D data received from the scan-conversion unit.

* * * * *